United States Patent
Kato et al.

(10) Patent No.: US 9,797,614 B2
(45) Date of Patent: Oct. 24, 2017

(54) AIR CONDITIONING SYSTEM

(75) Inventors: Yohei Kato, Tokyo (JP); Takashi Okazaki, Tokyo (JP); So Nomoto, Tokyo (JP); Koji Matsuzawa, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 1482 days.

(21) Appl. No.: 13/521,520

(22) PCT Filed: Feb. 24, 2010

(86) PCT No.: PCT/JP2010/052811
§ 371 (c)(1),
(2), (4) Date: Jul. 11, 2012

(87) PCT Pub. No.: WO2011/104827
PCT Pub. Date: Sep. 1, 2011

(65) Prior Publication Data
US 2012/0291468 A1     Nov. 22, 2012

(51) Int. Cl.
*F25B 39/04*     (2006.01)
*F24F 11/00*     (2006.01)
(Continued)

(52) U.S. Cl.
CPC ............ *F24F 11/006* (2013.01); *F24D 3/18* (2013.01); *F24D 19/1039* (2013.01); *F24F 3/06* (2013.01);
(Continued)

(58) Field of Classification Search
CPC ....... F24F 11/006; F25B 13/00; F25B 25/005; F25B 2313/0315; F25B 2313/003; F24D 2200/123
See application file for complete search history.

(56) References Cited

U.S. PATENT DOCUMENTS 5,095,715 A  *  3/1992  Dudley .................. F24D 17/02
                                                237/2 B
2003/0010047 A1     1/2003  Shimoda

FOREIGN PATENT DOCUMENTS

JP         62-91167 U    6/1987
JP         62-268917 A   11/1987
(Continued)

OTHER PUBLICATIONS

Eiji et al., Air Conditioning System, Mar. 5, 2003, JP2003065585A, Whole Document.*

(Continued)

*Primary Examiner* — Larry Furdge
(74) *Attorney, Agent, or Firm* — Buchanan Ingersoll & Rooney PC (57) ABSTRACT

An air conditioning system, a set temperature determining device determines a target temperature of water to be supplied to an indoor heat exchanger, based on ["target outflow temperature"="current outflow temperature"+(("inlet and outlet temperature difference"/"indoor and outdoor temperature difference")×"set temperature difference")]. The indoor and outdoor temperature difference is a difference between an indoor temperature and an outdoor temperature, the inlet and outlet temperature difference is a difference between temperatures of water at the inlet side and the outlet side of an intermediate heat exchanger, and the set temperature difference is a difference between an indoor temperature and a set temperature. A control device controls an outdoor unit in response to the target temperature determined by the set temperature determining device.

9 Claims, 7 Drawing Sheets

(51) Int. Cl.
  *F24F 3/06* (2006.01)
  *F24D 3/18* (2006.01)
  *F24D 19/10* (2006.01)
  *F24F 5/00* (2006.01)
  *F25B 13/00* (2006.01)
  *F25B 25/00* (2006.01)
  *F25B 49/02* (2006.01)
  *G05D 23/19* (2006.01)

(52) U.S. Cl.
  CPC .......... *F24F 5/0003* (2013.01); *F24F 11/008* (2013.01); *F24F 11/0012* (2013.01); *F25B 13/00* (2013.01); *F25B 25/005* (2013.01); *F25B 49/02* (2013.01); *G05D 23/1931* (2013.01); *F24D 2200/123* (2013.01); *F24D 2220/042* (2013.01); *F24F 2011/0013* (2013.01); *F25B 2313/003* (2013.01); *F25B 2313/0315* (2013.01)

(56) References Cited

FOREIGN PATENT DOCUMENTS

| | | | |
|---|---|---|---|
| JP | 2-208455 A | | 8/1990 |
| JP | H04143115 A | * | 5/1992 |
| JP | 6-180152 A | | 6/1994 |
| JP | 8-14672 A | | 1/1996 |
| JP | H1019288 A | * | 1/1998 |
| JP | 10-185241 A | | 7/1998 |
| JP | 11-63631 A | | 3/1999 |
| JP | 11-248232 A | | 9/1999 |
| JP | 2000241002 A | * | 9/2000 |
| JP | 2003-065585 A | | 3/2003 |
| JP | 2003065585 A | * | 3/2003 |
| JP | 2007-147094 A | | 6/2007 |
| JP | 2007-212085 A | | 8/2007 |
| JP | 2007-225213 A | | 9/2007 |
| JP | 2007-315682 A | | 12/2007 |

OTHER PUBLICATIONS

Shunji, Hot Water Supply Controller, Jan. 23, 1998, JPH1019288A, Whole Document.*
Hidehiko et al., Multiple Air Conditioner, Sep. 8, 2000, JP2000241002A, Whole Document.*
Yoshiki, Temperature Adjusting Device and Refrigerating Cycle, Sep. 6, 2007, JP2007225213A, Whole Document.*
Miyanaga, Air Conditioning Device for Vehicle, May 18, 1992, JPH04143115A, Whole Pages.*
International Search Report (PCT/ISA/210) issued on Jun. 1, 2010, by the Japanese Patent Office as the International Searching Authority for International Application No. PCT/JP2010/052811.
Extended European Search Report dated May 19, 2015 issued in corresponding European Patent Appln. No. 10801095.0 (7 pages).

* cited by examiner

$(Twom-Twi)/(Two-Twi)=(Taim-Tao)/(Tai-Tao)$

→ $Twom-Twi=((Taim-Tao)/(Tai-Tao))*(Two-Twi)$

→ $Twom+Two-Twi=Two+((Taim-Tao)/(Tai-Tao))*(Two-Twi)$

→ $Twom+(Two-Twi)=Two+((Taim-Tao)/(Tai-Tao))*(Two-Twi)$

→ $Twom=Two+((Taim-Tao)/(Tai-Tao))*(Two-Twi)-(Two-Twi)$

→ $Twom=Two+((Taim-Tao)/(Tai-Tao)-1)*(Two-Twi)$

→ $Twom=Two+(((Taim-Tao)-(Tai-Tao))/(Tai-Tao))*(Two-Twi)$

→ $Twom=Two+((Taim-Tai)/(Tai-Tao))*(Two-Twi)$

→ $Twom=Two+((Two-Twi)/(Tai-Tao))*(Taim-Tai)$

Fig. 3

→ (Twi−Twom)/(Twi−Two)=(Tao−Taim)/(Tao−Tai)
→ (Twom−Twi)/(Two−Twi)=(Tao−Taim)/(Tao−Tai)
→ Twom−Twi=((Tao−Taim)/(Tao−Tai))*(Two−Twi)
→ Twom+Two−Twi=Two+((Tao−Taim)/(Tao−Tai))*(Two−Twi)
→ Twom+(Two−Twi)=Two+((Tao−Taim)/(Tao−Tai))*(Two−Twi)
→ Twom=Two+((Tao−Taim)/(Tao−Tai))*(Two−Twi)−(Two−Twi)
→ Twom=Two+(((Tao−Taim)/(Tao−Tai))−1)*(Two−Twi)
→ Twom=Two+(((Tao−Taim)−(Tao−Tai))/(Tao−Tai))*(Two−Twi)
→ Twom=Two+((Tai−Taim)/(Tao−Tai))*(Two−Twi)
→ Twom=Two+((Two−Twi)/(Tao−Tai))*(Tai−Taim)

Fig. 6

AIR CONDITIONING SYSTEM

TECHNICAL FIELD

The present invention relates to an air conditioning system where a heat source device and an indoor heat exchanger are connected by a fluid circuit through which fluid such as water flows. Particularly, the present invention relates to a technique for controlling a temperature of the fluid, based on a predetermined index in the air conditioning system.

BACKGROUND ART

There is an air conditioning system that generates warm water or cold water by a heat source device such as a heat pump device, and sends the generated warm water or cold water to an indoor heat exchanger in order to perform heating or cooling in a room.

Generally, this air conditioning system is a method of evening out a temperature of water without depending on an air conditioning load, and for example, warm water of 35° C. is supplied to the indoor heat exchanger in the heating time, and cold water of 16° C. is supplied to the indoor heat exchanger in the cooling time. According to this method, in the case of the air conditioning load being small, such as in a period between seasons, a control is carried out such that the heat source device is stopped when the indoor temperature becomes a set value, or such that water supply to the indoor heat exchanger is stopped by controlling a three-way valve, etc. Therefore, the heating operation or the cooling operation is performed intermittently, and thereby reducing the user's comfort and decreasing the operational efficiency.

Moreover, there is an air conditioning system with a function that an installation contractor in installing the air conditioning system sets up a target temperature of water supplied by the heat source device according to an anticipated outdoor temperature. This air conditioning system is effective when a set target temperature is suitable for the air conditioning load. However, due to seasonal change etc., there may a case in which a target temperature is low for the air conditioning load, or a target water temperature is high for the air conditioning load. In such a case, operation of deficient performance or of excessive performance will be performed, thereby reducing the user's comfort and decreasing the operational efficiency.

Moreover, in Patent Literature 1, there is described a control method of re-setting a target temperature of water supplied by the heat source device, based on deviation between a target indoor temperature which a user set and a current indoor temperature. In Patent Literature 1, it is intended, by this control method, to realize high operational efficiency without reducing the comfort.

CITATION LIST

Patent Literature

Patent Literature 1:
Japanese Unexamined Patent Publication No. 2007-212085

SUMMARY OF INVENTION

Technical Problem

However, when setting a target temperature of water only based on the difference between a set temperature and an indoor temperature like the control method described in Patent Literature 1, there is a case where it is not set to a suitable target temperature. That is, there is a case where a temperature higher than a suitable target temperature is set as the target temperature, or a temperature lower than a suitable target temperature is set as the target temperature. Therefore, it may happen that an indoor temperature becomes too high for a set temperature or an indoor temperature becomes too low for a set temperature, thereby reducing the user's comfort and decreasing the operational efficiency.

The present invention aims to achieve high operational efficiency without reducing the user's comfort.

Solution to Problem

An air conditioning system according to the present invention which is equipped, for example, with a heat source device for heating or cooling fluid and an indoor heat exchanger for performing heat exchange between the fluid heated or cooled by the heat source device and an indoor air, the air conditioning system includes:

an indoor temperature measurement unit to measure an indoor temperature which is a temperature of the indoor air, an outdoor temperature measurement unit to measure an outdoor temperature, a target temperature determination unit to determine a target temperature so that the larger an indoor and outdoor temperature difference being a difference between the indoor temperature measured by the indoor temperature measurement unit and the outdoor temperature measured by the outdoor temperature measurement unit becomes, the smaller a change rate of the target temperature of the fluid to be supplied to the indoor heat exchanger from the heat source device becomes, and a control unit to control the heat source device in response to the target temperature determined by the target temperature determination unit.

Advantageous Effects of Invention

The air conditioning system according to the present invention determines a target temperature such that the larger an indoor and outdoor temperature difference becomes, the lower a target temperature of fluid becomes. Due to this, the target water temperature is appropriately set, thereby achieving high operational efficiency without reducing the comfort.

DESCRIPTION OF EMBODIMENTS

Embodiment 1

Figure 1:
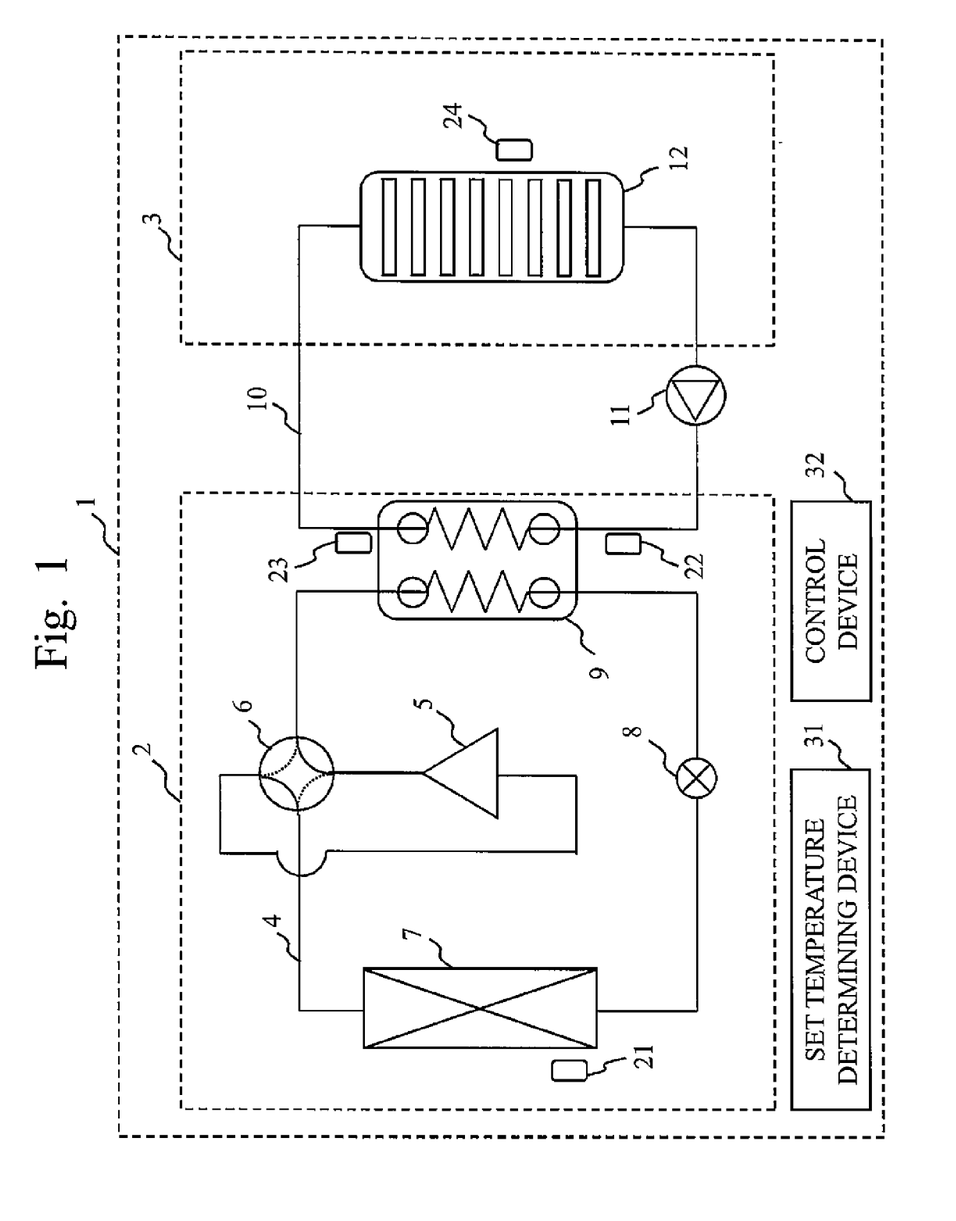
FIG. 1 shows a configuration of an air conditioning system 1.

FIG. 1 shows a configuration of an air conditioning system 1.

The air conditioning system 1 includes an outdoor unit 2 which is a heat source device equipped with a refrigerant circuit 4, and an indoor unit 3 equipped with an indoor heat exchanger 12. The outdoor unit 2 is installed outside a room and the indoor unit 3 is installed inside a room. The outdoor unit 2 and the indoor unit 3 are connected by a water circuit 10. The water circuit 10 is a circuit in which water circulates by a water pump 11.

The refrigerant circuit 4, in which a refrigerant circulates, is circularly formed by a compressor 5, a four-way valve 6, an outdoor heat exchanger 7, an expansion mechanism 8, and an intermediate heat exchanger 9 which are connected in series by piping.

The water circuit 10 is connected to the intermediate heat exchanger 9 which is connected to the refrigerant circuit 4. Therefore, heat exchange between the refrigerant circulating through the refrigerant circuit 4 and the water circulating through the water circuit 10 is carried out by the intermediate heat exchanger 9.

The compressor 5 is, for example, a hermetic compressor. Rotating speed of the compressor 5 can be changed by an inverter. The compressor 5 adjusts a flow volume of refrigerant circulating through the refrigerant circuit 4 by changing the rotating speed, and changes a heat exchange amount in the intermediate heat exchanger 9. By changing the amount of heat exchange in the intermediate heat exchanger 9, the temperature of water flowing out of the outdoor unit 2 changes.

The four-way valve 6 is a switching unit which switches a flow direction of refrigerant circulating through the refrigerant circuit 4. When there is no need for the air conditioning system 1 to switch the flow of the refrigerant, such as the case of cooling only, it is not necessary to change the flow direction of the refrigerant. Therefore, the four-way valve 6 is dispensable in such a case.

The outdoor heat exchanger 7 is, for example, a fin and tube type heat exchanger whose heat source is air (outdoor air). Heat exchange between the refrigerant circulating through the refrigerant circuit 4 and the outdoor air is carried out in the outdoor heat exchanger 7. When the outdoor heat exchanger 7 is a fin and tube type heat exchanger, a heat exchange in the outdoor heat exchanger 7 can be promoted by equipping the outdoor unit 2 with an outdoor fan.

Moreover, the outdoor heat exchanger 7 may be a heat exchanger buried in the ground to use a geothermal heat as the heat source. Geothermal heat serves as a stable heat source through a year. Moreover, the outdoor heat exchanger 7 may be a plate heat exchanger. In that case, water, antifreeze solution, etc. are used as the heat source.

The expansion mechanism 8 is, for example, a mechanism having a variable open degree. In the expansion mechanism 8, the open degree is adjusted so that the degree of supercooling at the condenser outlet or the degree of superheating at the evaporator outlet may become as small as possible, and the flow volume of refrigerant is adjusted so that the outdoor heat exchanger 7 and the intermediate heat exchanger 9 may be effectively utilized.

Moreover, the expansion mechanism 8 may be structured by arranging in parallel a plurality of throttling devices each having a fixed open degree, such as a capillary.

The intermediate heat exchanger 9 is, for example, a plate heat exchanger. As described above, a heat exchange between a refrigerant circulating through the refrigerant circuit 4 and water circulating through the water circuit 10 is carried out in the intermediate heat exchanger 9. Thereby, the intermediate heat exchanger 9 heats the water circulating through the water circuit 10 to generate warm water, or cools the water circulating through the water circuit 10 to generate cold water. Then, the intermediate heat exchanger 9 supplies the generated warm water or cold water to the water circuit 10.

Moreover, a heat exchanger of a double pipe type or a flooded type may be used as the intermediate heat exchanger 9.

The water pump 11 supplies water to the outdoor unit 2 and the indoor unit 3 by circulating water. The water pump 11 is a pump whose rotating speed can be changed by an inverter, etc. By changing the rotating speed, the flow volume of the water circulating through the water circuit 10 can be changed.

Moreover, the water pump 11 may be structured by combining a pump whose rotating speed is fixed and a capacity control valve whose open degree can be changed. In such a case, the flow volume of the water circulating through the water circuit 10 can be changed by adjusting the open degree of the capacity control valve.

In the case of not changing the flow volume of the water circulating through the water circuit 10, the water pump 11 may be a pump whose rotating speed is fixed.

The indoor heat exchanger 12 is, for example, a radiator. The indoor heat exchanger 12 performs a heat exchange between the water circulating through the water circuit 10 and the indoor air, and heats or cools the indoor air.

Moreover, the indoor heat exchanger 12 is not limited to a radiator, but may be a fan coil unit, a floor heating panel, etc.

The outdoor unit 2 includes an outdoor temperature detector 21 (an outdoor temperature detection unit), an inlet water temperature detector 22 (a prior temperature detection unit), and an outlet water temperature detector 23 (a posterior temperature detection unit). The outdoor temperature detector 21 detects an outdoor air temperature being an outdoor temperature. The inlet water temperature detector 22 detects a temperature of water which flows through the water circuit 10 and flows into the outdoor unit 2. That is, the inlet water temperature detector 22 detects a temperature of water to be flowed into the intermediate heat exchanger 9. The outlet water temperature detector 23 detects a temperature of water which flows through the water circuit 10 and flows out from the outdoor unit 2. That is, the outlet water temperature detector 23 detects a temperature of water flowing out from the intermediate heat exchanger 9.

Moreover, the indoor unit 3 includes an indoor temperature detector 24 (indoor temperature detection unit). The indoor temperature detector 24 detects an indoor temperature.

The air conditioning system 1 includes a set temperature determining device 31 (target temperature determination unit) and a control device 32 (control unit).

The set temperature determining device 31 determines a target temperature of the water flowing out from the outdoor unit 2, based on temperatures detected by the outdoor temperature detector 21, the inlet water temperature detector 22, the outlet water temperature detector 23, and the indoor temperature detector 24.

In response to the target temperature determined by the set temperature determining device 31, the control device 32 sends an instruction to the compressor 5 to control the rotating speed of the compressor 5, and makes the temperature of the water flowing out from the outdoor unit 2 be the target temperature. Moreover, the control device 32 controls the expansion mechanism 8 in order to adjust the flow volume of the refrigerant circulating through the refrigerant circuit 4. Further, the control device 32 controls the water pump 11 in order to adjust the flow volume of the water circulating through the water circuit 10.

The set temperature determining device 31 and the control device 32 are computers, such as microcomputers. Although the set temperature determining device 31 and the control device 32 are shown as separate computers in FIG. 1, they may be realized by one computer.

Next, there will be described a method that the set temperature determining device 31 determines a target outflow temperature which is a target temperature of water flowing out from the outdoor unit 2.

The set temperature determining device 31 determines a target outflow temperature, which is for making the indoor temperature be the set temperature set by the user of the air conditioning system 1, based on a heat balance relation between a heat exchange amount Qw of the intermediate heat exchanger 9, which is a capacity of the outdoor unit 2, and an indoor load, which is expressed by a heat exchange amount Qio between the indoor air and the outdoor air.

First, the case of heating operation will be described.

The heat exchange amount Qw in the intermediate heat exchanger 9 can be expressed by the equation 1 based on a flow volume Gw of water, a specific heat Cpw of water, an inflow temperature Twi (prior temperature) which is a temperature of water to be flowed into the intermediate heat exchanger 9, and an outflow temperature Two (posterior temperature) which is a temperature of water flowing out from the intermediate heat exchanger 9.

$$Qw = Gw \times Cpw \times (Two - Twi) \qquad \text{<Equation 1>}$$

On the other hand, a current indoor load, namely the heat exchange amount Qio between the indoor air and the outdoor air, can be expressed by the equation 2 based on a heat exchange performance AKio of a building, an indoor temperature Tai which is a temperature of indoor air, and an outdoor temperature Tao which is a temperature of outdoor air. The heat exchange performance AKio of a building is a product of a heat exchange area A between the indoor air and the outdoor air, and an overall heat transfer coefficient Kio indicating a heat transfer performance between the indoor air and the outdoor air.

$$Qio = AKio \times (Tai - Tao) \qquad \text{<Equation 2>}$$

When the heat exchange amount Qw in the intermediate heat exchanger and the heat exchange amount Qio between the indoor air and the outdoor air are balanced (that is, when Qw=Qio), the following equation can be obtained from the equations 1 and 2.

$$Gw \times Cpw \times (Two - Twi) = AKio \times (Tai - Tao)$$

Transforming this equation, the following equation can be obtained.

$$(Two - Twi) = (AKio/(Gw \times Cpw)) \times (Tai - Tao)$$

Substituting C1 for (AKio/(Gw×Cpw)), the relation among the inflow temperature Twi, the outflow temperature Two, the indoor temperature Tai, and the outdoor temperature Tao can be expressed by the equation 3. C1 is a constant determined based on the flow volume Gw of water, the specific heat Cpw of water, and the heat exchange performance AKio of a building.

$$(Two - Twi) = C1 \times (Tai - Tao) \qquad \text{<Equation 3>}$$

Then, when changing the outflow temperature Two to an outflow temperature Twom, if the indoor temperature Tai accords with a target indoor temperature Taim, the relation between the target indoor temperature Taim and the outflow temperature Twom can be expressed by the equation 4.

$$(Twom - Twi) = C1 \times (Taim - Tao) \qquad \text{<Equation 4>}$$

C1 can be expressed as follows based on the equation 3.

$$C1 = (Two - Twi)/(Tai - Tao)$$

Similarly, C1 can be expressed as follows based on the equation 4.

$$C1 = (Twom - Twi)/(Taim - Tao)$$

Therefore, the following equation is obtained from these two equations.

$$(Two - Twi)/(Tai - Tao) = (Twom - Twi)/(Taim - Tao)$$

Transforming this equation, the relation among the inflow temperature Twi, the outflow temperature Two, the indoor temperature Tai, the outdoor temperature Tao, the target indoor temperature Taim, and the outflow temperature Twom can be expressed by the equation 5.

$$(Twom - Twi)/(Two - Twi) = (Taim - Tao)/(Tai - Tao) \qquad \text{<Equation 5>}$$

Figure 2:
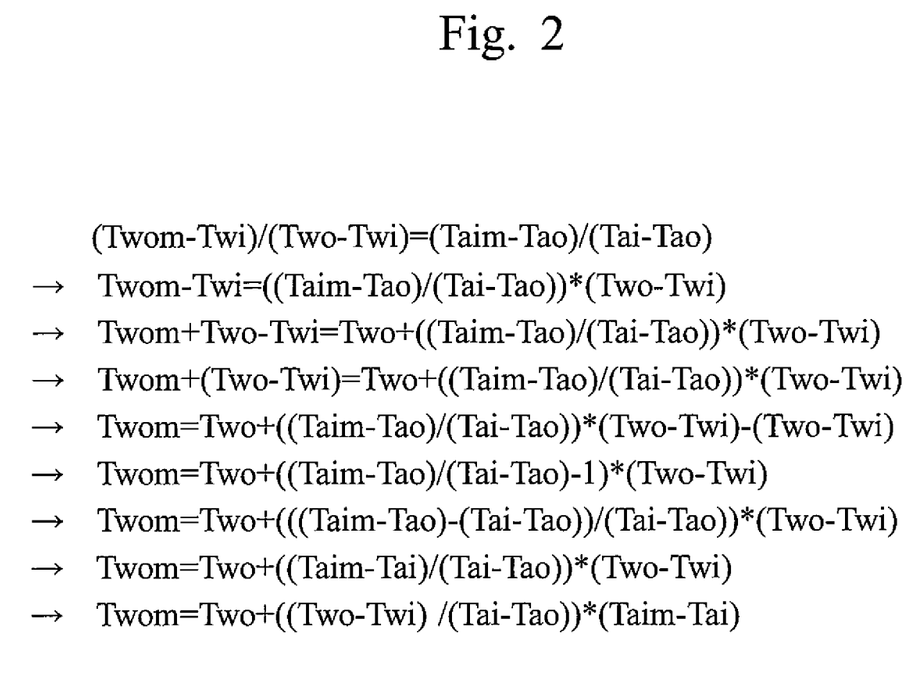
FIG. 2 describes equation transform of a target outflow temperature Twom to the equation 6 in the heating operation.

If the equation 5 is transformed as shown in FIG. 2, the equation 6 can be obtained.

$$Twom = Two + ((Two - Twi)/(Tai - Tao)) \times (Taim - Tai) \qquad \text{<Equation 6>}$$

Next, the case of cooling operation will be described.

In the cooling case, Two<Twi and Tai<Tao. Here, the heat exchange amount Qw in the intermediate heat exchanger 9 and the heat exchange amount Qio between the indoor air and the outdoor air are positive values (values greater than 0). Therefore, the equation 1' corresponding to the equation 1 and the equation 2' corresponding to the equation 2 are as follows:

$$Qw = Gw \times Cpw \times (Twi - Two) \qquad \text{<Equation 1'>}$$

$$Qio = AKio \times (Tao - Tai) \qquad \text{Equation 2'>}$$

Then, the equation 3' corresponding to the equation 3 and the equation 4' corresponding to the equation 4 are as follows:

$$(Twi - Two) = C1 \times (Tao - Tai) \qquad \text{<Equation 3'>}$$

$$(Twi - Twom) = C1 \times (Tao - Taim) \qquad \text{<Equation 4'>}$$

Based on the equations 3' and 4', the equation 5' corresponding to the equation 5 is as follows:

$$(Twi - Twom)/(Twi - Two) = (Tao - Taim)/(Tao - Tai) \qquad \text{<Equation 5'>}$$

Figure 3:
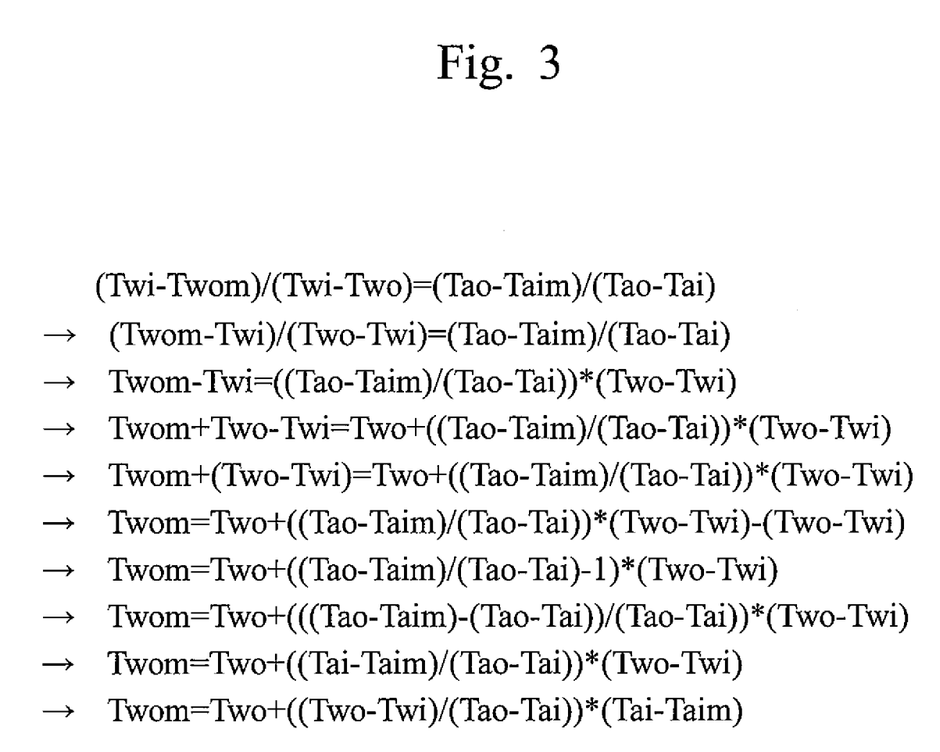
FIG. 3 describes equation transform of a target outflow temperature Twom to the equation 6' in the cooling operation.

If the equation 5' is transformed as shown in FIG. 3, the equation 6' corresponding to the equation 6 can be obtained.

$$Twom = Two + ((Two - Twi)/(Tao - Tai)) \times (Tai - Taim) \qquad \text{<Equation 6'>}$$

Here, Two in the equation 6 indicating the target outflow temperature Twom in the heating operation is a current outflow temperature. (Tai−Tao) in the equation 6 indicates an indoor and outdoor temperature difference which is a difference between the indoor temperature Tai and the outdoor temperature Tao. (Two−Twi) in the equation 6 indicates an inlet and outlet temperature difference (a prior and posterior temperature difference) which is a difference between the outflow temperature Two and the inflow temperature Twi. (Taim−Tai) in the equation 6 indicates a set temperature difference which is a difference between the target indoor temperature Taim (a set temperature) and the indoor temperature Tai (a current indoor temperature).

Similarly, Two in the equation 6' indicating the target outflow temperature Twom at the cooling operation is a current outflow temperature. (Tao−Tai) in the equation 6 indicates an indoor and outdoor temperature difference which is a difference between the outdoor temperature Tao and the indoor temperature Tai. (Two−Twi) in the equation 6 indicates an inlet and outlet temperature difference (a prior and posterior temperature difference) which is a difference between the outflow temperature Two and the inflow temperature Twi. (Tai−Taim) in the equation 6 indicates a set temperature difference which is a difference between the target indoor temperature Taim (a set temperature) and the indoor temperature Tai (a current indoor temperature).

Therefore, both the equations 6 and 6' can be expressed as the equation 7.

"target outflow temperature"="current outflow temperature"+(("inlet and outlet temperature difference"/"indoor and outdoor temperature difference")×"set temperature difference")   <Equation 7>

The set temperature determining device 31 calculates a target outflow temperature (a target temperature) based on the equation 7.

As seen from the equation 7, the set temperature determining device 31 determines a target outflow temperature to be in inverse proportion to the indoor and outdoor temperature difference. That is, the set temperature determining device 31 determines a target outflow temperature so that the larger the indoor and outdoor temperature difference becomes, the smaller the change rate of the target outflow temperature becomes, and the smaller the indoor and outdoor temperature difference becomes, the larger the change rate of the target outflow temperature becomes.

Moreover, as seen from the equation 7, the set temperature determining device 31 determines a target outflow temperature to be in proportion to the inlet and outlet temperature difference. That is, the set temperature determining device 31 determines a target outflow temperature so that the larger the inlet and outlet temperature difference becomes, the larger the change rate of the target outflow temperature becomes, and the smaller the inlet and outlet temperature difference becomes, the smaller the change rate of the target outflow temperature becomes.

Moreover, as seen from the equation 7, the set temperature determining device 31 determines a target outflow temperature to be in proportion to the set temperature difference. That is, the set temperature determining device 31 determines a target outflow temperature so that the larger the set temperature difference becomes, the larger the change rate of the target outflow temperature becomes, and the smaller the set temperature difference becomes, the smaller the change rate of the target outflow temperature becomes.

Specifically, the set temperature determining device 31 determines a target outflow temperature by adding a correction value 1 which is calculated from [("inlet and outlet temperature difference"/"indoor and outdoor temperature difference")×"set temperature difference"] to a current outflow temperature.

In addition, the set temperature determining device 31 may calculate the correction value 1 from [(("inlet and outlet temperature difference"/"indoor and outdoor temperature difference")×"set temperature difference")×K1] by using a relaxation coefficient K1 being a value smaller than 1. By calculating the correction value 1 by using the relaxation coefficient K1, the target outflow temperature will not be greatly changed. That is, when calculating the correction value 1 by using the relaxation coefficient K1, the outdoor unit 2 is controlled so that the target outflow temperature may be gradually changed and thus the indoor temperature finally may be the same as the set temperature. Therefore, it is difficult for an indoor temperature to become too high for a set temperature in the heating operation or to become too low for a set temperature in the cooling operation.

Figure 4:
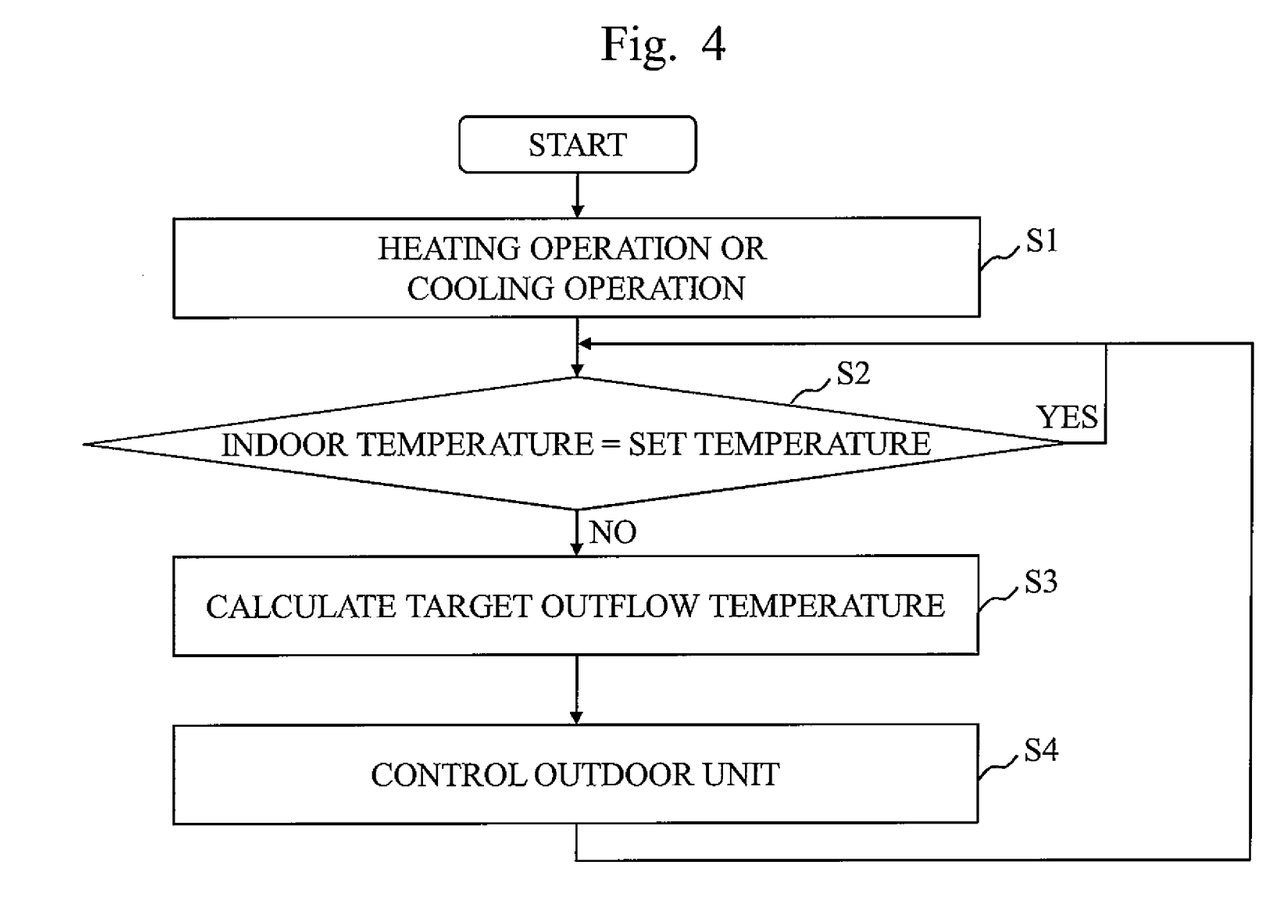
FIG. 4 shows a flowchart of processing of the air conditioning system 1.

FIG. 4 is a flowchart showing processing of the air conditioning system 1.

In (S1), when the operation of the air conditioning system 1 is started, the set temperature determining device 31 judges whether it is a heating operation or a cooling operation. If it is a heating operation, the equation 6 previously stored in the storage device is read out. In contrast, if it is a cooling operation, the equation 6' previously stored in the storage device is read out.

In (S2), the set temperature determining device 31 judges whether the indoor temperature and the set temperature are equal or not. When the difference between the indoor temperature and the set temperature is within a predetermined range, the set temperature determining device 31 judges that the indoor temperature and the set temperature are equal.

When the indoor temperature and the set temperature are equal, the set temperature determining device 31 does not change the target outflow temperature, and then, after a predetermined time has passed, judges again whether the indoor temperature and the set temperature are equal or not. In contrast, when the indoor temperature is different from the set temperature, the set temperature determining device 31 advances the processing to (S3).

In (S3), the set temperature determining device 31 calculates a target outflow temperature, based on the equation read out in (S1).

In (S4), the control device 32 controls the outdoor unit 2 in response to the target outflow temperature calculated in (S3). For example, the control device 32 changes the rotating speed of the compressor 5 in response to the target outflow temperature, and thus changes the heat exchange amount Qw in the intermediate heat exchanger 9.

When the indoor temperature is lower than the set temperature, the correction value 1 is usually a positive value. As a result, the target outflow temperature becomes higher than the current outflow temperature. In the case of heating operation, the control device 32 increases the rotating speed of the compressor 5, and thus increases the heat exchange amount Qw in the intermediate heat exchanger 9. Thereby, heating the water in the intermediate heat exchanger 9 is promoted, and thus the temperature of the water flowing out from the outdoor unit 2 is increased.

In contrast, when the indoor temperature is higher than the set temperature, the correction value 1 is usually a negative value. As a result, the target outflow temperature becomes lower than the current outflow temperature. In the case of heating operation, the control device 32 decreases the rotating speed of the compressor 5, and thus decreases the heat exchange amount Qw in the intermediate heat exchanger 9. Thereby, heating the water in the intermediate heat exchanger 9 is suppressed, and thus the temperature of the water flowing out from the outdoor unit 2 is lowered.

Influence of an indoor and outdoor temperature difference in calculating a target outflow temperature will be explained referring to the case of heating operation as an example.

Figure 5:
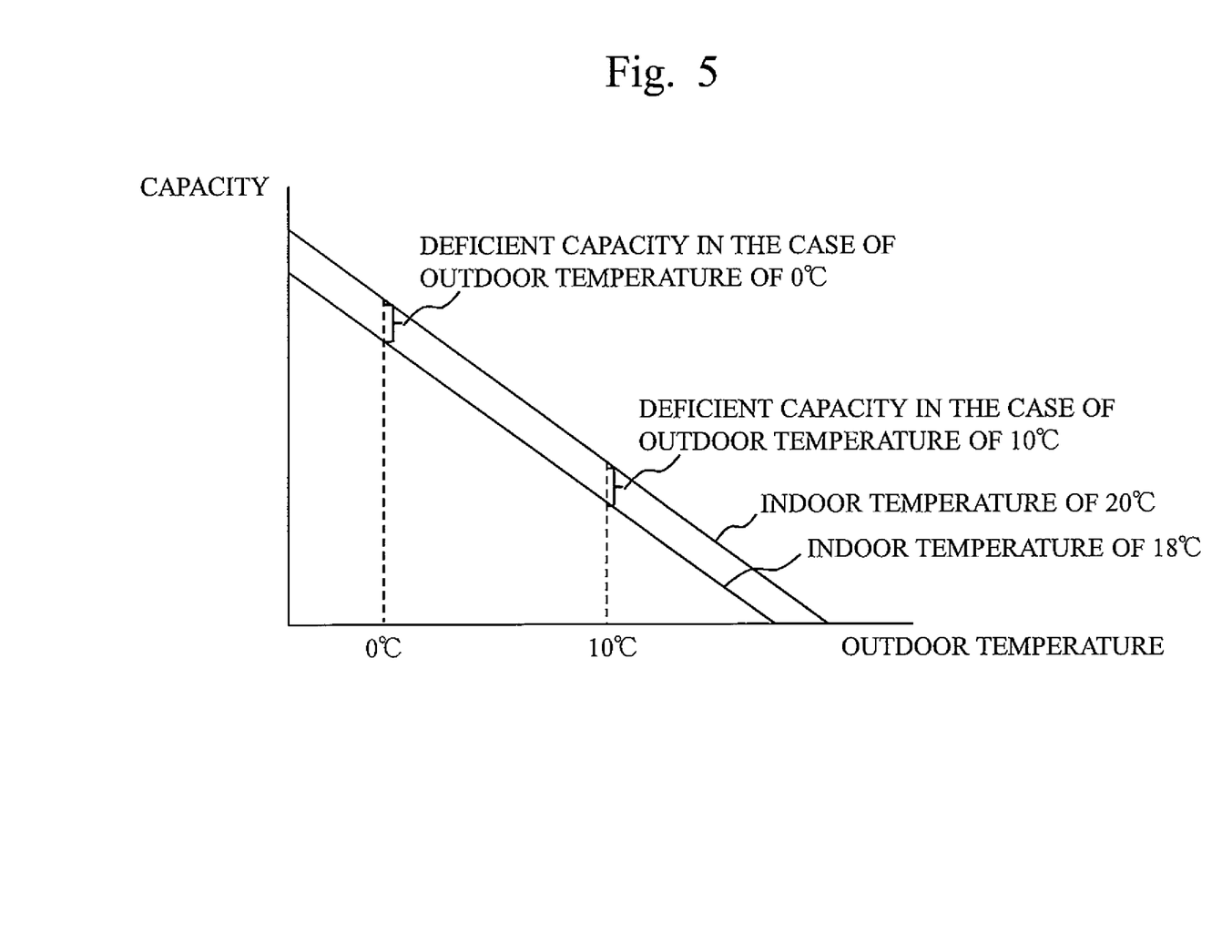
FIG. 5 shows an influence of an indoor and outdoor temperature difference in calculating a target outflow temperature.

FIG. 5 illustrates influence of an indoor and outdoor temperature difference in calculating a target outflow temperature. In FIG. 5, the horizontal axis shows an outdoor air temperature, and the vertical axis shows capacity of the outdoor unit 2.

Here, the indoor temperature shall be 18° C. and the set temperature shall be 20° C. Under this circumstance, influence on calculation of a target outflow temperature will be explained for the cases of the outdoor air temperature of 0° C. and 10° C.

When the outdoor air temperature is 0° C., compared with the case when the outdoor air temperature is 10° C., the outdoor unit 2 needs to have a higher capacity in order to make the indoor temperature be 20° C. which is a set temperature. Similarly, when the outdoor air temperature is 0° C., compared with the case when the outdoor air temperature is 10° C., the outdoor unit 2 has needed to have a higher capacity so as to make the indoor temperature be 18° C. which is the current indoor temperature.

The ratio between the capacity of the outdoor unit 2 necessary for making the indoor temperature be 20° C. which is a set temperature, and the capacity of the outdoor unit 2 necessary for making the indoor temperature be 18° C. which is the current indoor temperature will be compared for the case of the outdoor temperature being 0° C. and the case of the outdoor temperature being 10° C.

The ratio of the capacity of the outdoor unit 2 in the case of the outdoor air temperature of 0° C. is (18° C.−0° C.)/(20° C.−0° C.)×100=90%. That is, when the outdoor air temperature is 0° C., there is a capacity deficiency of about 10%. In other words, it can be said that when the outdoor air temperature is 0° C., the indoor temperature of 18° C. becomes the set temperature of 20° C. if the target outflow temperature is increased by an increase corresponding to a capacity of about 10%.

On the other hand, the ratio of the capacity of the outdoor unit 2 in the case of the outdoor air temperature of 10° C. is (18° C.−10° C.)/(20° C.−10° C.)×100=80%. That is, when the outdoor air temperature is 10° C., there is a capacity deficiency of about 20%. In other words, it can be said that when the outdoor air temperature is 10° C., the indoor temperature of 18° C. becomes the set temperature of 20° C. if the target outflow temperature is increased by an increase corresponding to a capacity of about 20%.

Figure 6:
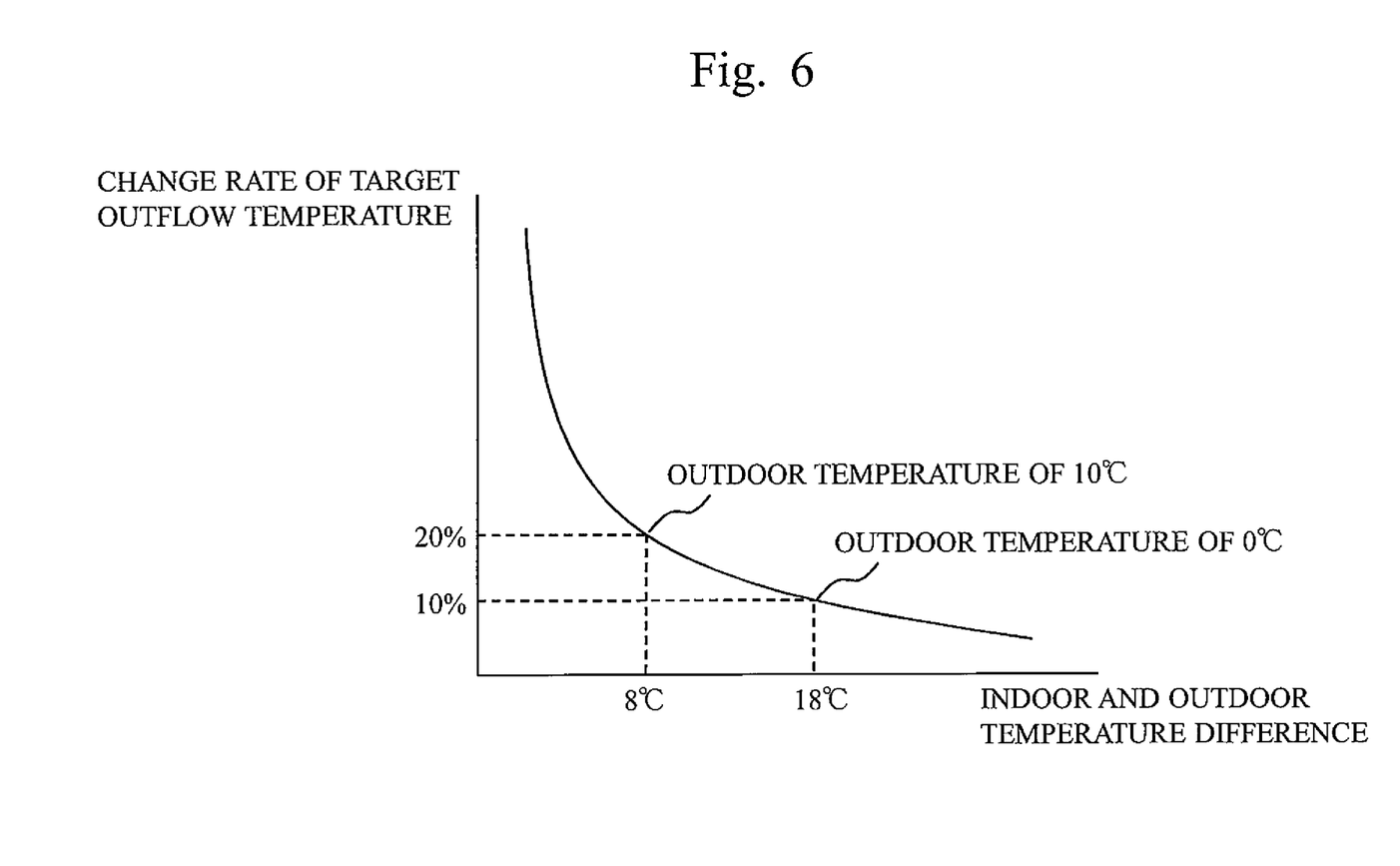
FIG. 6 shows a relation between an indoor and outdoor temperature difference and a target outflow temperature.

FIG. 6 shows a relation between an indoor and outdoor temperature difference and a change rate of a target outflow temperature. When the outdoor temperature is 0° C., the change rate of the target outflow temperature is small compared with the case of the outdoor temperature of 10° C. That is, even when set temperature differences, each being a difference between a set temperature and an indoor temperature, are equal with each other, the change rate of a target outflow temperature is small when the indoor and outdoor temperature difference is large, and the change rate of a target outflow temperature is large when the indoor and outdoor temperature difference is small.

Influence of an inlet and outlet temperature difference in calculating a target outflow temperature will be explained referring to the case of heating operation as an example.

Here, influence on calculation of a target outflow temperature will be explained for the cases of the outflow temperature of 40° C. and of 35° C. when the inflow temperature is 30° C.

Transforming the equation 5, it becomes as follows:

$$(Twom-Twi)=((Taim-Tao)/(Tai-Tao))\times(Two-Twi)$$

Substituting $\alpha$ for (Taim−Tao)/(Tai−Tao), a difference between the target outflow temperature Twom and the inflow temperature Twi can be expressed by the equation 8.

$$(Twom-Twi)=\alpha\times(Two-Twi) \quad \text{<Equation 8>}$$

When the outflow temperature is 40° C., namely when the inlet and outlet temperature difference is large, it can be expressed as follows based on the equation 8.

$$(Twom-Twi)=\alpha\times(40°\text{ C.}-30°\text{ C.})$$

Therefore, the target outflow temperature Twom in this case becomes the equation 9.

$$Twom=\alpha\times10°\text{ C.}+30°\text{ C.} \quad \text{<Equation 9>}$$

Similarly, when the outflow temperature is 35° C., that is when the inlet and outlet temperature difference is small, it can be expressed as follows based on the equation 8.

$$(Twom-Twi)=\alpha\times(35°\text{ C.}-30°\text{ C.})$$

Therefore, the target outflow temperature Twom in this case becomes the equation 10.

$$Twom=\alpha\times5°\text{ C.}+30°\text{ C.} \quad \text{<Equation 10>}$$

That is, in the case of the inlet and outlet temperature difference being large, the change rate of the target outflow temperature is larger compared with the case of the inlet and outlet temperature difference being small.

That is, even when set temperature differences, each being a difference between a set temperature and an indoor temperature, are equal with each other, the change rate of a target outflow temperature is large when the inlet and outlet temperature difference is large, and the change rate of a target outflow temperature is small when the inlet and outlet temperature difference is small.

In addition, when the flow volume of the water circulating through the water circuit 10 is fixed, the inlet and outlet temperature difference indicates capacity of the outdoor unit 2. That is, the larger the inlet and outlet temperature difference is, the higher the capacity of the outdoor unit 2 is, and the smaller the inlet and outlet temperature difference is, the lower the capacity of the outdoor unit 2 is. Therefore, it can be said that even when set temperature differences, each being a difference between a set temperature and an indoor temperature, are equal with each other, the change rate of a target outflow temperature is large when the capacity of the outdoor unit 2 is high, and the change rate of a target outflow temperature is small when the capacity of the outdoor unit 2 is low.

As described above, the air conditioning system 1 according to the present Embodiment determines a target outflow temperature based on not only the set temperature difference but also the indoor and outdoor temperature difference and the inlet and outlet temperature difference. Therefore, a suitable target outflow temperature can be set, thereby performing a control of high operational efficiency without reducing the user's comfort.

Although also the indoor temperature changes in response to a change of the outflow temperature, the responsiveness of the change of the indoor temperature for the change of the outflow temperature depends on the heat capacity of a building. Therefore, the larger the heat capacity of the building, the slower the responsiveness.

Then, the set temperature determining device 31 may change a time interval for setting a new target outflow temperature, in accordance with the heat capacity of the building. For example, when the heat capacity of the building is large and the indoor temperature change is slow, the set temperature determining device 31 lengthens a time interval for setting a new target outflow temperature. By this, it becomes possible to prevent the target outflow temperature from being changed while the indoor temperature is changing, and thus to prevent the outflow temperature from becoming higher (or lower) than needed. As a result, it is possible to prevent the indoor temperature from becoming higher (or lower) than the set temperature.

Therefore, further, the user's comfort is improved and the operational efficiency is also enhanced.

In addition, it is also acceptable to store temperatures detected at predetermined intervals by the indoor temperature detector 24 in the storage device, and to measure a heat capacity of the building, based on a temperature variation range of the indoor temperature and the current indoor temperature.

Moreover, if the flow volume of the water pump 11 is made to be fixed regardless of an indoor load, waste is produced when the indoor load is small. Then, the control device 32 may change the flow volume of the water pump 11 to be in proportion to an electric power used in the outdoor unit 2. In other words, the electric power used in the water pump 11 may be fixed with respect to the electric power used in the entire air conditioning system 1. Thereby, the operational efficiency is improved.

In the above description, the air conditioning system 1 having only one indoor unit 3 is described. However, there may be a case where the air conditioning system 1 has a plurality of indoor units 3 and each indoor unit 3 is installed in a different room. In such a case, the set temperature determining device 31 treats the temperature of a representative room as the indoor temperature. For example, the representative room may be a room where the set temperature difference, which is a difference between a set temperature and an indoor temperature, is the largest, or may be a room where a predetermined indoor unit 3 is installed as the main unit.

Embodiment 2

In Embodiment 2, there will be described a method of preventing a target outflow temperature from being set higher (or lower) than needed and thus preventing an indoor temperature from becoming higher (or lower) than a set temperature.

Only the points different from Embodiment 1 will be described in Embodiment 2.

According to Embodiment 1, the set temperature determining device 31 calculates a target outflow temperature by adding a correction value 1 to a current outflow temperature.

According to Embodiment 2, a correction value 2 is newly defined, and then the set temperature determining device 31 calculates a target outflow temperature by adding a correction value 1 and a correction value 2 to a current outflow temperature.

Here, the correction value 2 is a value for performing correction so that a target outflow temperature may be prevented from being set higher (or lower) than needed, in order for an indoor temperature not to become higher (or lower) than a set temperature.

The correction value 2 in the case of heating operation is expressed by the equation 11 using an anticipated reaching temperature $Tai(\infty)$ being a temperature which an indoor temperature is anticipated to reach after a predetermined time has passed.

Correction value $2=((Two-Twi)/(Tai(\infty)-Tao))\times (Taim-Tai_{(\infty)})$ <Equation 11>

Similarly, the correction value 2 in the case of cooling operation is expressed by the equation 11' using $Tai(\infty)$.

Correction value $2=((Two-Twi)/(Tao-Tai(\infty)))\times (Tai(\infty)-Taim)$ <Equation 11'>

There are two different points between the correction value 1 and the correction value 2. The first point is that the correction value 1 uses an indoor and outdoor temperature difference, which is a difference between a current indoor temperature and an outdoor temperature, and in contrast, the correction value 2 uses an anticipated indoor and outdoor temperature difference, which is a difference between an anticipated reaching temperature after a predetermined time having passed and an outdoor temperature. The second point is that the correction value 1 uses a set temperature difference, which is a difference between a current indoor temperature and a set temperature, and, in contrast, the correction value 2 uses an anticipated set temperature difference, which is a difference between an anticipated reaching temperature after a predetermined time having passed and a set temperature.

That is, the correction value 1 is [("inlet and outlet temperature difference"/"indoor and outdoor temperature difference")×"set temperature difference"], and in contrast, the correction value 2 is [("inlet and outlet temperature difference"/"anticipated indoor and outdoor temperature difference")×"anticipated set temperature difference"]. It has been explain that the correction value 1 may be obtained, using a relaxation coefficient K1, as [(("inlet and outlet temperature difference"/"indoor and outdoor temperature difference")×"set temperature difference")×K1]. Similarly, the correction value 2 may be obtained, using a relaxation coefficient K2, as [(("inlet and outlet temperature difference"/"anticipated indoor and outdoor temperature difference")×"anticipated set temperature difference")×K2]. Here, the relaxation coefficient K2 is, like the relaxation coefficient K1, a value smaller than 1.

Therefore, the correction value 2 is determined to be in inverse proportion to an anticipated indoor and outdoor temperature difference. That is, the larger an anticipated indoor and outdoor temperature difference, the smaller the correction value 2, and the smaller an anticipated indoor and outdoor temperature difference, the larger the correction value 2.

Moreover, the correction value 2 is determined to be in proportion to an anticipated set temperature difference. That is, the larger an anticipated set temperature difference, the larger the correction value 2, and the smaller an anticipated set temperature difference, the smaller the correction value 2.

Figure 7:
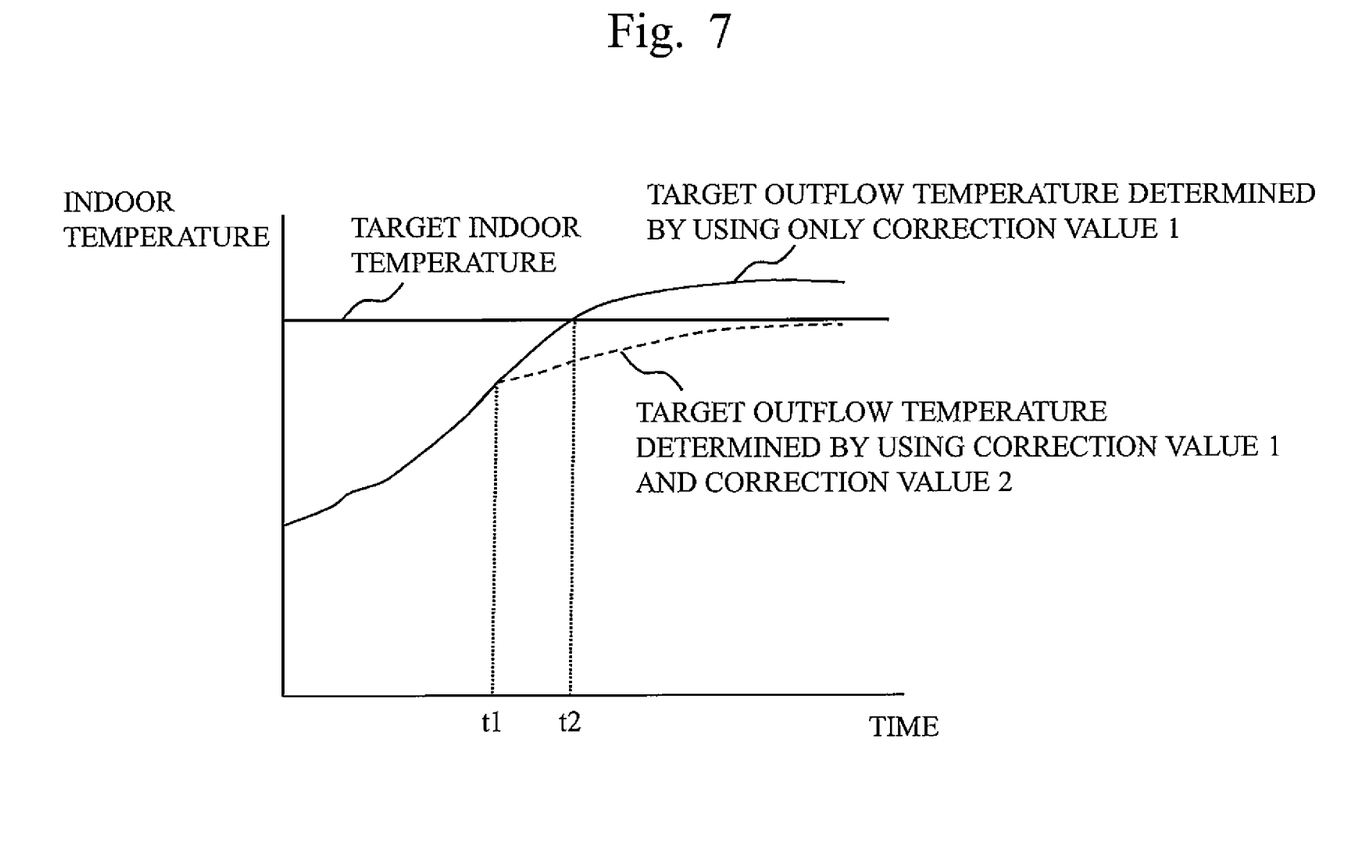
FIG. 7 shows an example of change of an indoor temperature in the case of determining a target outflow temperature by using only a correction value 1 and in the case of determining a target outflow temperature by using a correction value 1 and a correction value 2.

FIG. 7 shows an example of change of an indoor temperature in the case of determining a target outflow temperature by using only the correction value 1 and in the case of determining a target outflow temperature by using the correction value 1 and the correction value 2.

There may a case where a current indoor temperature is lower than a set temperature but an anticipated reaching temperature is higher than the set temperature. In such a case, the correction value 1 is usually a positive value and the correction value 2 is usually a negative value. That is, since the current indoor temperature is lower than the set temperature, the correction value 1 acts toward increasing the heating capacity by raising the target outflow temperature. On the other hand, since the anticipated reaching temperature is higher than the set temperature, the correction value 2 acts toward decreasing the heating capacity by lowering the target outflow temperature.

Thus, by calculating a target outflow temperature by using the correction value 2, the target outflow temperature is prevented from being set higher (or lower) than needed so that the indoor temperature may not be higher (or lower) than the set temperature.

In FIG. 7, up to the time t1, the same target outflow temperatures have been calculated when determining the target outflow temperature by using the correction value 1 and when determining the target outflow temperature by using the correction value 1 and the correction value 2. Therefore, the same indoor temperatures are obtained in both the cases. However, after the time t1, the current indoor temperature is lower than the set temperature but the anticipated reaching temperature is higher than the set temperature. Thus, the correction value 2 acts toward decreasing the heating capacity by lowering the target outflow temperature. As a result, when the target outflow temperature is determined only by using the correction value 1, the indoor temperature exceeds the target indoor temperature a little after the time t2. In contrast, when the target outflow temperature is determined by using the correction value 1 and the correction value 2, the indoor temperature never exceeds the target indoor temperature though it takes time for the indoor temperature to approach the target indoor temperature.

In addition, any method may be used as the method of calculating an anticipated reaching temperature Tai(∞), and, for example, it can be calculated using a predetermined equation based on indoor temperatures measured at a plurality of past times and outflow temperatures at those times. As equations for calculating an indoor temperature, and an outflow temperature and an anticipated reaching temperature Tai(∞) at that time, equations already known may be used.

As described above, the air conditioning system 1 according to this Embodiment calculates a target outflow temperature by using the correction value 2 in addition to the correction value 1. Thereby, it is possible to prevent a target outflow temperature from being set higher (or lower) than needed, and to prevent an indoor temperature from becoming higher (or lower) than a set temperature. Therefore, controlling of high operational efficiency can be performed without reducing the user's comfort.

In the above description, the water circuit 10 which connects the intermediate heat exchanger 9 and the indoor heat exchanger 12 is a circuit through which water flows. However, the circuit connecting the intermediate heat exchanger 9 and the indoor heat exchanger 12 is not limited to the circuit through which water flows, and it may be a circuit through which other fluid flows. That is, the fluid heated or cooled in the intermediate heat exchanger 9 may be fluid other than water.

REFERENCE SIGNS LIST

1 Air Conditioning System, 2 Outdoor Unit, 3 Indoor Unit, 4 Refrigerant Circuit, 5 Compressor, 6 Four-way Valve, 7 Outdoor Heat Exchanger, 8 Expansion Mechanism, 9 Intermediate Heat Exchanger, 10 Water Circuit, 11 Water Pump, 12 Indoor Heat Exchanger, 21 Outdoor Temperature Detector, 22 Inlet Water Temperature Detector, 23 Outlet Water Temperature Detector, 24 Indoor Temperature Detector, 31 Set Temperature Determining Device, 32 Control Device

The invention claimed is:

1. An air conditioning system which includes a heat source device for heating or cooling fluid and an indoor heat exchanger for performing heat exchange between the fluid heated or cooled by the heat source device and an indoor air, the air conditioning system comprising:
    an indoor temperature detection unit to detect an indoor temperature which is a temperature of the indoor air;
    an outdoor temperature detection unit to detect an outdoor temperature;
    a target temperature determination unit to determine a target temperature of the fluid to be supplied to the indoor heat exchanger from the heat source device so that the larger an indoor and outdoor temperature difference being a difference between the indoor temperature detected by the indoor temperature detection unit and the outdoor temperature detected by the outdoor temperature detection unit becomes, the smaller a change rate of the target temperature of the fluid to be supplied to the indoor heat exchanger from the heat source device becomes; and
    a control unit to control the heat source device in response to the target temperature determined by the target temperature determination unit.

2. The air conditioning system as defined in claim 1 further comprising:
    a prior temperature detection unit to detect a prior temperature of the fluid prior to being heated or cooled by the heat source device; and
    a posterior temperature detection unit to detect a posterior temperature of the fluid posterior to being heated or cooled by the heat source device,
    wherein the target temperature determination unit further determines the target temperature so that the larger a prior and posterior temperature difference being a difference between the prior temperature detected by the prior temperature detection unit and the posterior temperature detected by the posterior temperature detection unit becomes, the larger the change rate of the target temperature becomes.

3. The air conditioning system as defined in claim 2:
    wherein the target temperature determination unit, to acquire a set indoor temperature which is a preset reaching target temperature of the indoor air, further determines the target temperature so that the larger a set temperature difference being a difference between the indoor temperature detected by the indoor temperature detection unit and the set indoor temperature acquired by the set indoor temperature acquisition unit becomes, the larger the change rate of the target temperature becomes.

4. The air conditioning system as defined in claim 3,
    wherein the target temperature determination unit calculates a correction value 1 by [("the prior and posterior temperature difference"/"the indoor and outdoor temperature difference")ד the set temperature difference"] and adds the correction value 1 to the target temperature which has been currently set, in order to obtain a new target temperature.

5. The air conditioning system as defined in claim 1,
    wherein the heat source device is a heat pump type heat source device including a refrigerant circuit where a compressor, a first heat exchanger, an expansion mechanism, and a second heat exchanger are connected in series by piping and where a refrigerant circulates, and wherein the fluid is heated or cooled by heat exchange between the refrigerant and the fluid in the first heat exchanger, and the control unit controls the compressor in response to the target temperature.

6. The air conditioning system as defined in claim 1, wherein the target temperature determination unit controls an interval for determining a new target temperature, in accordance with an indoor heat capacity.

7. The air conditioning system as defined in claim 1 further comprising:

an indoor temperature storage unit to store the indoor temperature detected by the indoor temperature detection unit in a storage device at predetermined intervals; and wherein the target temperature determination unit calculates a changing amount of the indoor temperature for each unit of time, based on the indoor temperature stored by the indoor temperature storage unit, and controls an interval for determining a new target temperature so that the smaller the changing amount of the indoor temperature for each unit of time becomes, the longer the interval for determining the new target temperature becomes.

8. The air conditioning system as defined in claim 1 further comprising:

a fluid circuit which connects the heat source device and the indoor heat exchanger and through which fluid circulates, wherein the control unit further controls a circulation volume of the fluid circulating through the fluid circuit in response to control of the heat source device.

9. The air conditioning system as defined in claim 1 comprising:

a plurality of indoor heat exchangers each installed in each of a plurality of rooms, wherein the indoor temperature detection unit detects a temperature of indoor air of a room where an indoor heat exchanger of the plurality of indoor heat exchangers is installed, as the indoor temperature.

* * * * *